Nov. 6, 1956   H. C. RHODES   2,769,408
DOUGH MOLDING APPARATUS
Filed Oct. 9, 1953   2 Sheets-Sheet 1
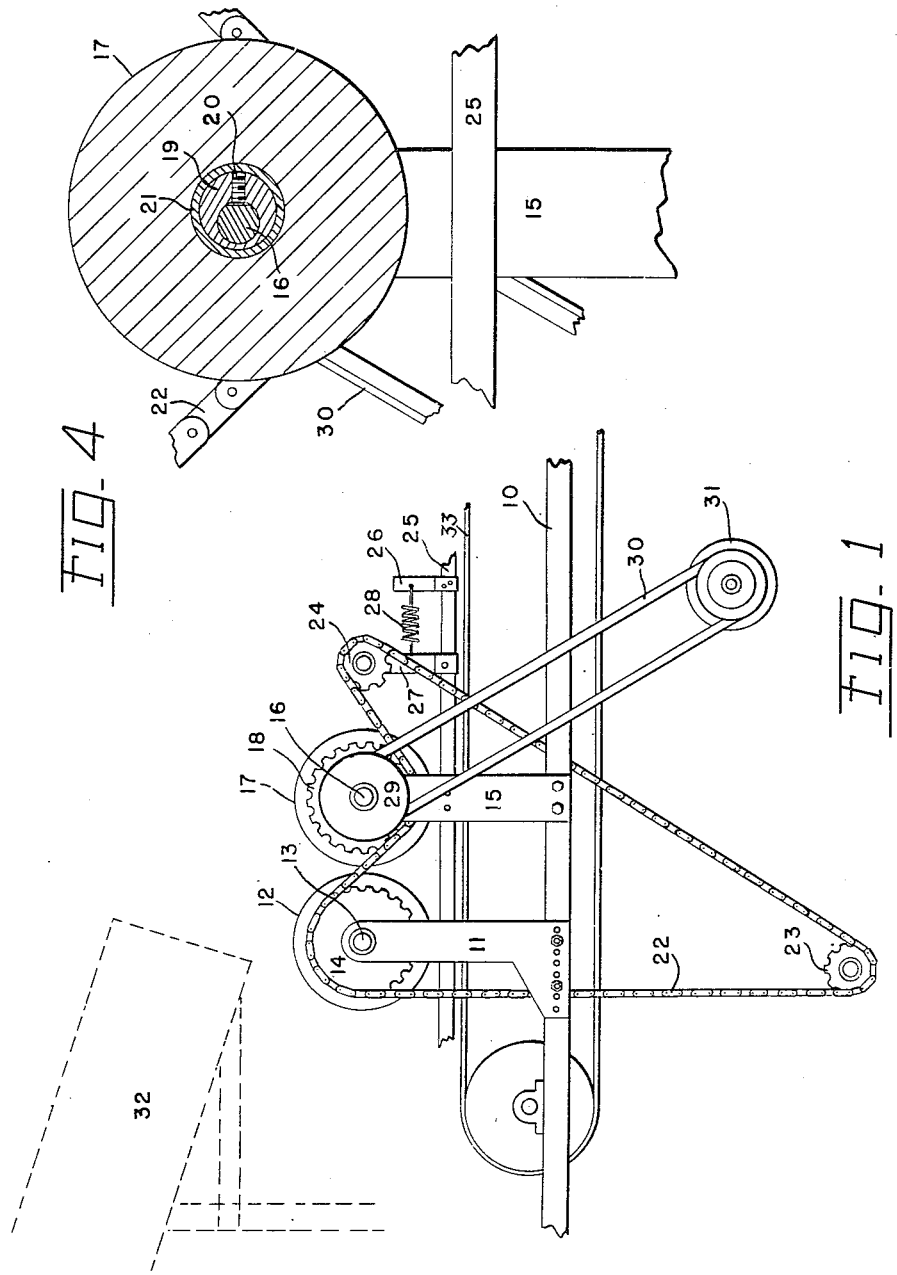
INVENTOR.
HERBERT C. RHODES
BY
*L.R. Geisler*
ATTORNEY Nov. 6, 1956   H. C. RHODES   2,769,408
DOUGH MOLDING APPARATUS Filed Oct. 9, 1953   2 Sheets—Sheet 2

INVENTOR.
HERBERT C. RHODES
BY T. R. Geisler
ATTORNEY

United States Patent Office 2,769,408
Patented Nov. 6, 1956

2,769,408

DOUGH MOLDING APPARATUS

Herbert C. Rhodes, Portland, Oreg.

Application October 9, 1953, Serial No. 385,042

2 Claims. (Cl. 107—12)

This invention relates to dough treating and handling machines in which lumps of dough are fed through moving elements, specifically rotating rolls, in order to cause such dough pieces to be formed or molded into flattened masses of dough of pre-determined thickness, as for example, into sheets suitable for subsequent coiling into dough loaves for deposit in baking pans.

In reducing the lumps of dough to the desired flattened and relatively thin sheets of dough it has heretofore been necessary to pass the dough through several pairs of rotating molding rolls, since it was found that any attempts to reduce the thickness of the dough too much or too rapidly with any single pair of rolls frequently caused tears in the dough pieces, necessitating removal of the dough pieces and the holding up of the operation of the dough molding machine temporarily pending the removal of such torn pieces.

I have discovered, however, that if the spacing between a pair of dough molding rolls is made to vary rapidly, that is to say, if the molding rolls move relatively towards and away from each other more or less rapidly while they are rotating and moving the dough along between them, the subjecting of the dough to this additional pulsating or squeezing action acts to prevent tears occurring in the dough. In this way, I have found it possible, with a single pair of rolls, to press a piece of dough into a sheet of the same thinness which would otherwise require the employment of a plurality of sets or pairs of rolls.

I have also discovered not only that the tendency for dough to tear, when subjected to rapid reduction in thinness, is reduced under my improved dough molding method, but also that the quality of the dough itself appears to be improved as a result of the pulsating squeezing treatment. I do not attempt to explain the reason for this improved quality of the dough.

A related object of my invention is to provide apparatus whereby pieces of dough can be quickly molded into thin flat sheets without danger of a dough piece tearing or separating either entirely or in part.

Another object of the invention is to provide an improved apparatus in mechanical dough molding with rotating rolls which will enable the desired molding of the dough to be accomplished with fewer sets of rolls than has heretofore been considered feasible.

A further and specific object of the invention is to provide a pair of improved dough molding rolls, so arranged, constructed and operating, that, in addition to spreading and flattening the dough, the rolls will also subject the dough to rapid squeezing pulsations during such spreading and flattening.

The manner in which these objects and incidental advantages are achieved, and the means by which these objects are accomplished, will be briefly described with respect to the accompanying drawings.

Referring to the drawings:

Fig. 1 is a fragmentary side elevation of a dough molding device embodying the present invention;

Figure 3:
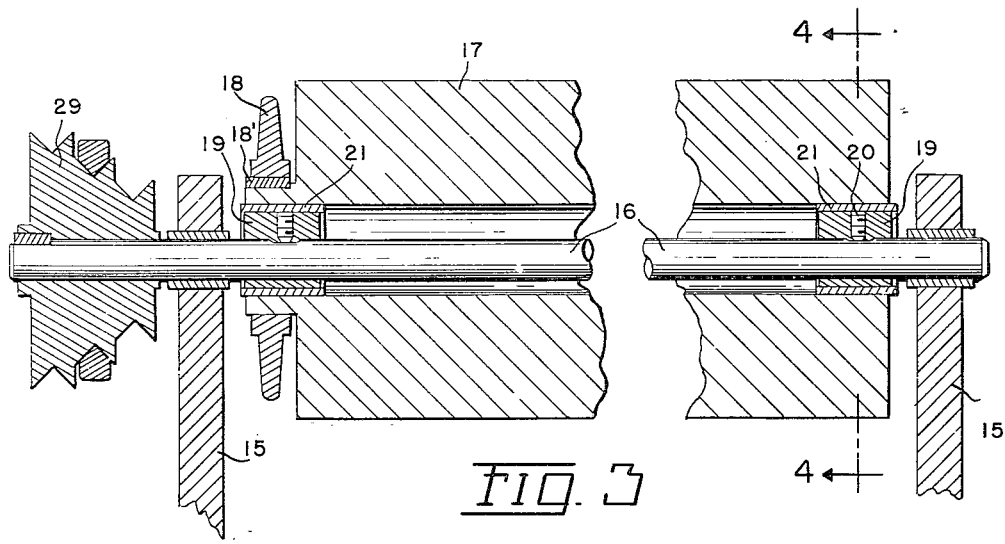
Figure 2:
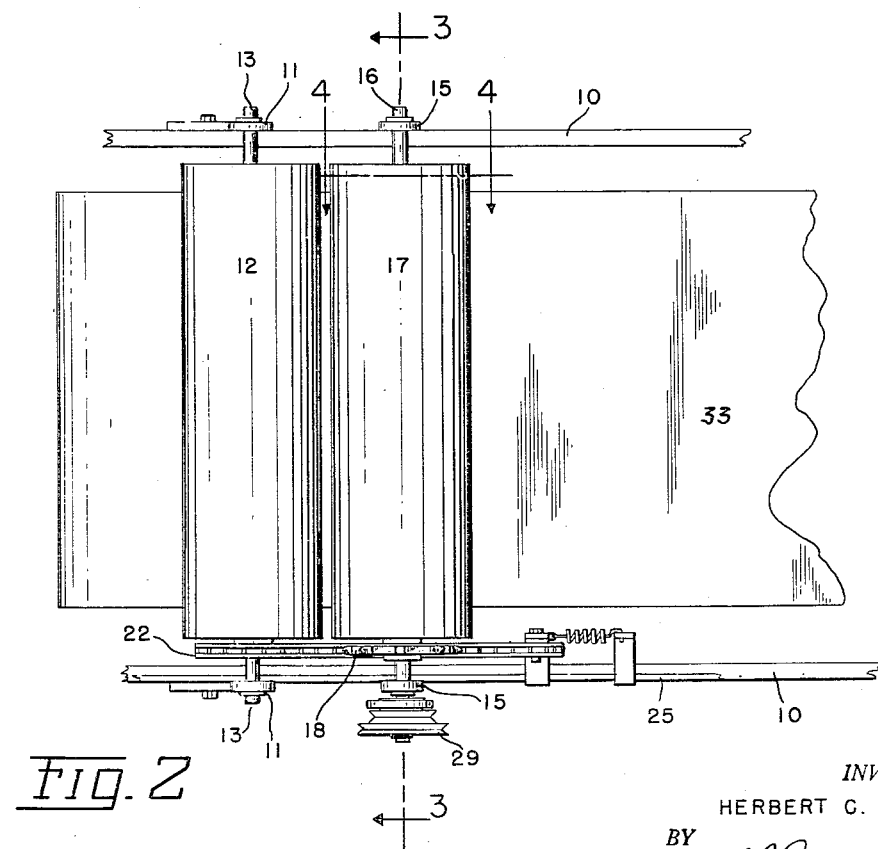
Fig. 2 is a fragmentary plan view of the same.

Fig. 3 is an enlarged fragmentary sectional elevation taken on lines 3—3 of Fig. 2; and Fig. 4 is a cross section through one of the molding rolls corresponding to lines 4—4 of Figs. 2 and 3.

Referring first to Figs. 1 and 2, a pair of longitudinal side members 10, 10 of a suitable frame structure adjustably support a pair of upright brackets 11, 11 in which the shaft 13 for a dough-molding roll 12 is mounted. A second pair of brackets 15, 15 are secured to the frame members 10, 10 and rotatably support a shaft 16 for a companion dough-molding roll 17. The cylindrical surfaces of the two rolls 12 and 17 are identical.

Although the roll 12 is concentrically mounted on its shaft 13 with the shaft axis and the axis of the roll being identical as usual, the roll 17 on the other hand is eccentrically mounted on its shaft 16, as shown in Figs. 3 and 4. A pair of identical eccentric mountings 19, 19 (Fig. 3), having an outer cylindrical bearing surface, are secured on the shaft 16 in spaced identical position by means of set screws 20. Each eccentric mounting 19 carries a cylindrical bushing 21 for the roll 17, thus enabling the roll 17 to be rotatable with respect to the supporting shaft 16. The supporting shaft 16, in turn, is rotatably mounted in the brackets 15, 15, as shown.

A sprocket wheel 14 is secured on the end of the roll 12, and an identical sprocket wheel 18 is similarly secured on the end of the roll 17 (Fig. 3) by a suitable key 18'. A driven endless sprocket chain 22 (Fig. 1) passes around a driving sprocket 23, thence over sprocket 14, under sprocket 18, and over idler sprocket 24. Consequently, rotation of the drive sprocket 23, in clockwise direction, as viewed in Fig. 1, results in clockwise rotation of roll 12 and counter-clockwise rotation of roll 17. Thus the rolls 12 and 17 are rotated at the same speed but in opposite directions towards each other. The sprocket 23 is driven from a suitable source of power (not shown). The idler sprocket 24 is supported on a bracket 27 which is pivotally mounted on a stationary upper frame bar 25. An arm 26, rigidly attached to the frame bar 25, is connected with the bracket 27 by a tension spring 28. In this way the development of any undesirable slack in the sprocket chain 22 is prevented.

A belt pulley 29 (Figs. 1 and 3), is secured on the end of the shaft 16 and is adapted to be connected with a drive pulley 31 by a suitable V-velt 30. The drive pulley 31 is driven in counter-clockwise direction (as viewed in Fig. 1) by a motor or other suitable means (not shown).

As will be apparent, the rotation of the pulley 29, and with it the shaft 16 and the eccentric roll mountings 19, 19, will cause the position of roll 17 with respect to the roll 12 to fluctuate. In other words, the spacing between the two rolls 12 and 17 will alternately increase and decrease. As will also be apparent, the rate at which the spacing between the two rolls fluctuates will depend upon the speed of rotation of the pulley 29 and will be entirely independent of the speed at which the rolls 12 and 17 are rotated, and vice versa. Preferably, though not necessarily, the two pulleys 29 and 31 are of the speed change type so that the speed of the pulley 29 with respect to the speed at which pulley 31 is driven can be varied. Variable speed means for driving the pulley 31 would serve the same purpose.

The pieces of dough to be molded are delivered onto the rolls 12 and 17 in any suitable manner, for example, from an inclined trough indicated in broken lines at 32 in Fig. 1. As each piece of dough drops between the rolls, it is drawn down between the rolls and then delivered from the rolls onto a conveyor such as the usual endless traveling belt which is indicated at 33. However, since the two rolls 12 and 17 are not only rotating in opposite direction toward each other at a constant desired rate of speed, but also the spacing between the rolls at the same time is rapidly fluctuating or pulsating, each piece of dough as it is pressed and flattened during its passage between the rolls is subjected also to a rapid pulsating squeezing action.

It will be found that, as a result of the pulsating, squeezing treatment of the dough while it passes between the rolls, the rolls can be set closer together without likelihood of tears occurring in the dough pieces than would be possible if both rolls were positioned in the usual manner on stationary axes. As a consequence, with a single pair of rolls exerting pulsating squeezing pressure on the dough passing between them, the thickness of the dough can be reduced to an extent which would otherwise require successive pairs of rolls.

The rapidity with which the squeezing pulsations should occur under any given condition for achieving most satisfactory results is a matter which can best be determined by experiment in each case. The speed at which the rolls are rotated, the thinness to which the dough is to be reduced, and the nature of the dough itself are all influencing factors. As a general rule, if the dough pieces show any tendency to tear apart, the rapidity of the pulsations should be increased. With a device such as that illustrated in the drawings, it is possible to run tests at various speeds of roll rotation and with squeezing pulsations of different frequencies until optimum results with any particular type of dough and for the desired minimum spacing of the rolls is obtained.

Several modifications and substitutions could, of course, be made in the particular device which I have illustrated and described as a means for bringing about the necessary rapid or pulsating variations in the spacing between the two rotating molding rolls as a means of carrying out my invention. The particular means which I have described is given merely as an illustration of a simple practical means which I have found satisfactory.

I claim:
1. In a dough molding machine, a pair of rotating dough molding rolls, a rotatable roll-supporting shaft, roll mounting means eccentrically carried by said shaft, one of said rolls rotatably mounted on said mounting means, means for rotating said rolls towards each other at the same peripheral speed, and means for rapidly rotating said shaft and said eccentrically-carried roll mounting means independently of the rotation of said rolls, whereby the spacing between said rolls can be rapidly varied and thereby cause the dough to be subjected to rapid variations in spreading pressure during the passage of the dough between the rolls.

2. In a dough molding machine, a pair of rotating dough molding rolls of the same diameter, a rotatable roll-supporting shaft, roll mounting means eccentrically carried by said shaft, one of said rolls rotatably mounted on said mounting means, supporting means for the other of said rolls supporting said other roll for rotation on an adjustably fixed axis, means for rotating said rolls towards each other at the same speed, and separate means for rapidly rotating said shaft and said eccentrically-carried roll mounting means in a direction opposite the direction of rotation of said roll on said eccentrically-carried means, whereby the spacing between said rolls can be rapidly varied and thereby cause the dough to be subjected to rapid variations in spreading pressure during the passage of the dough between the rolls.

References Cited in the file of this patent

UNITED STATES PATENTS

| | | |
|---|---|---|
| 576,373 | Mitchell | Feb. 2, 1897 |
| 777,349 | Mitchell | Dec. 13, 1904 |
| 841,408 | Kruse et al. | Jan. 15, 1907 |
| 906,271 | Palmer et al. | Dec. 8, 1908 |
| 2,157,192 | Thurlings | May 9, 1939 |
| 2,170,424 | Parsons | Aug. 22, 1939 |
| 2,621,364 | Stillman | Dec. 16, 1952 |
| 2,664,214 | Lewis | Dec. 29, 1953 |